United States Patent [19]
Nelson

[11] 3,795,476
[45] Mar. 5, 1974

[54] COMBUSTION CONTROL APPARATUS

[75] Inventor: Lorne W. Nelson, Bloomington, Minn.

[73] Assignee: Honeywell Inc., Minneapolis, Minn.

[22] Filed: Nov. 6, 1972

[21] Appl. No.: 304,158

[52] U.S. Cl. .................................. 431/90, 431/12
[51] Int. Cl. ............................................. F23n 1/02
[58] Field of Search .................. 431/12, 90; 236/14

[56] References Cited
UNITED STATES PATENTS

| | | | |
|---|---|---|---|
| 3,299,940 | 1/1967 | Philips et al. | 431/90 |
| 2,768,675 | 10/1956 | Conn | 431/90 |
| 3,391,866 | 7/1968 | Rohrer | 236/14 |
| 2,870,778 | 1/1959 | McCarty | 431/90 X |
| 3,209,811 | 10/1965 | Strang | 431/90 X |

*Primary Examiner*—Edward G. Favors
*Attorney, Agent, or Firm*—Alan M. Staubly; Lamont B. Koontz

[57] ABSTRACT

Combustion control apparatus for a gas furnace wherein a dual thermostat senses the furnace water temperature to turn on the gas and to then modulate air flow in accordance with heat demand. A diaphragm gas valve has a pressure regulator therein that responds to the air pressure to adjust the diaphragm valve to maintain a substantially constant fuel/air ratio.

8 Claims, 1 Drawing Figure

PATENTED MAR 5 1974
3,795,476
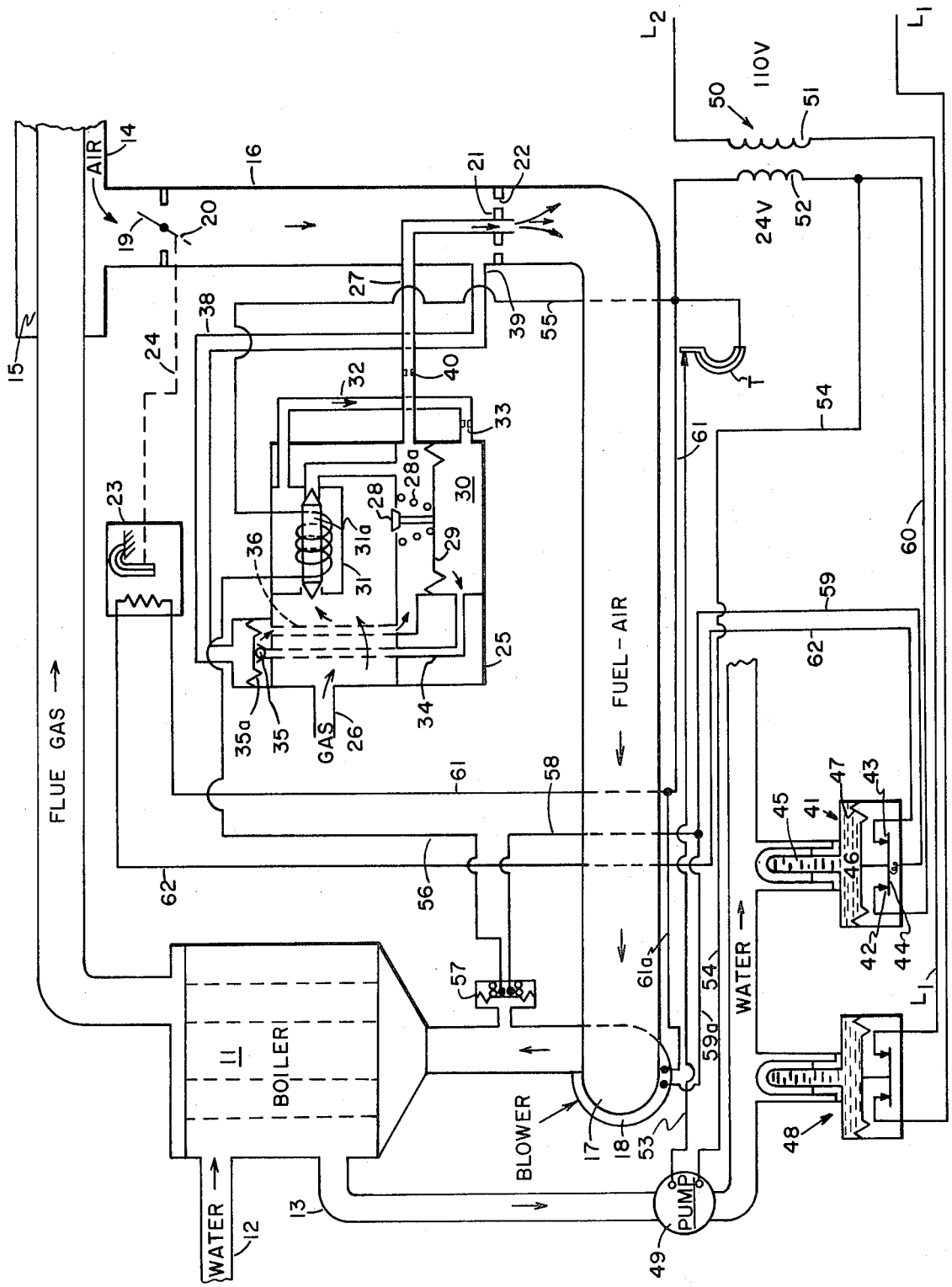

COMBUSTION CONTROL APPARATUS

This invention is an improvement over the Combustion Control Valve Means and System of the applicant's copending application Ser. No. 209,793, filed Dec. 20, 1971 and now U.S. Pat. No. 3,741,710. The invention, as in said application, makes use of a gas valve similar to the one disclosed in U.S. Pat. No. 3,354,901, a modulating type of air valve and a dual thermostat as the main control elements of the system.

The only FIGURE of the drawing is a schematic one illustrating the system in an operating condition.

A furnace conduit has a boiler 11 with a water inlet 12 and an outlet conduit 13 leading to the spaces (not shown) to be heated by the water flowing through suitable heat exchangers (not shown).

Combustion air is supplied to the furnace through an air intake conduit 14 surrounding a flue gas exhaust pipe 15 and through a conduit 16 connected to the inlet 17 of an air blower 18. From the blower, air enters the combustion chamber of the furnace below the boiler 11. An air damper 19 is located in the conduit 16 and either has minimum flow openings 20 in the damper itself or a bypass around the damper (not shown). Downstream of the damper 19, is a partition 21 having air flow restrictions 22 therein to control the rate of air flow through the conduit 16 to the blower. The damper 20 is adapted to be actuated by a suitable motor 23 mechanically connected thereto by a suitable driving connection 24.

Gas from a suitable source is supplied to a gas valve 25 through an inlet pipe 26 and flows from the valve through a pipe or conduit 27 and through partition 21 to exhaust into the conduit 16 downstream of the partition 21. A main gas control valve 28 is operated by a diaphragm 29 against the bias of closing spring 28a, when gas under pressure is supplied to the chamber 30. Positioned between the inlet of valve 25 and chamber 30 is a three-way valve 31 that, when energized, permits gas to flow from the inlet through passageway 32 and orifice 33 to the chamber 30, as illustrated in the drawing. When gas is flowing to chamber 30, gas also flows from the chamber through passageway 34 and past pressure regulator valve 35 and through passageway 36 to the outlet of the gas valve.

The pressure regulator valve 35 has a passageway 38 leading from the chamber above its diaphragm 35a to the air conduit 16 at junction 39, upstream of the partition 21. It is to be noted that the pressure above the diaphragm of the regulator 35 will be subatmospheric when the blower is operating due to the throttling of the air by the damper 19. Therefore, when the blower and gas valve are placed in operation, the valve 35 will open by gas pressure under the diaphragm and reduced air pressure above it to permit gas to bleed from the chamber 30 and to tend to close the main valve 28 in opposition to the opening of the valve 28 in response to the supply of gas through the control valve 31 to chamber 30 Should the pressure at the outlet of the gas valve increase, the diaphragm of the regulator valve 35 will sense the increase in pressure and move the valve 35 to increase the flow of bleed gas from chamber 30, to tend to close valve 28, thus providing pressure regulation of the gas leaving valve 25. Should the damper 19 open, the pressure above the pressure regulator diaphragm will increase and partially close the valve 35, thus causing the valve 28 to open wider and supply more gas. An orifice 40 in the outlet of the gas valve also provides a control of the gas flow by providing a back pressure above the diaphragm 29 of the main valve.

A thermostat, generally designated by the reference numeral 41, may be located in the boiler or in the boiler outlet conduit or pipe 13 may have a pair of fixed contacts 42 and 43 and a movable contact bar 44 adapted to sequentially engage the contacts 42 and 43, in that order, as the temperature of the water drops to 170° and 165° F, respectively. The thermostat preferably has a bulb 45 which projects into the water and a chamber 46 which communicates with the interior of the bulb with both being filled with liquid, so that as the liquid expands and contracts it operates a diaphragm 47 connected to the movable contact 44. As the water temperature increases, contacts 43 and 44 separate first followed by the separation of the contacts 42 and 44. The breaking temperatures are preferably 175° F for contacts 43 and 44 and 180° F for contacts 42 and 44 although other temperatures may be chosen as desired. The contacts closing temperatures may also be different, or desired. A similar high limit single thermostat 48 is also provided in the water conduit 13, to control the high voltage circuit $L_1 - L_2$, although it could obviously be placed in the low voltage circuit, if desired.

A water circulating pump 49 is located in the water conduit 12 or 13 and is controlled by a space or room thermostat T. When the pump is energized, water is drawn from the boiler and circulated to heat exchangers in the space to be heated, which causes water to flow over the thermostats 41 and 48. The heating of the water is controlled by thermostats 41 and 48.

The electrical system for the apparatus includes a transformer generally designated by the reference numeral 50 and having a high voltage coil 51 and a low voltage coil 52, preferably 24 volts. The thermostat T is connected to one end of the low voltage coil and is connected to the pump 49 through line 53 and through a return line 54 from the pump to the other end of the coil. The coil is also connected through line 55 to the coil of control valve 31, through line 56 to a pressure switch 57, through line 58 and 59 to contact bar 44, through contact 42 and line 60 to the other end of the low voltage coil. Blower 18 is connected through branch lines 59a and 61a to coil 52. Coil 52 is also connected at one end through line 61 to the coil of motor 23 (which may be a bimetal heating coil) and through line 62, contacts 43 and 44, contacts 42 and 44 and line 60 to the other end of coil 52.

OPERATION

When there is no heat demand, that is when the room thermostat T is satisfied and its contacts are broken, the water circulating pump 49 is not operating and there is no flow of water over the high limit thermostat 48 or control thermostat 41. Also, after the thermostat 41 has been satisfied by the water temperature having reached 180° F, the blower and gas valves will each be de-energized causing no air flow or fuel flow. In this condition the valve plunger 31a will be in seating engagement with the inlet to the valve 31 to cut off communication between the gas valve inlet and chamber 30. This permits spring 28a to close valve 28, gas being exhausted from chamber 30 through orifice 33 and the outlet passage from valve 31 to the outlet 27.

Upon a call for heat by the thermostat T, the circuit to the water pump 49 is closed, as mentioned above, causing water to be drawn from the boiler and over the thermostats 41 and 48 and to be delivered to the heat exchangers in the space to be heated. When the water temperature drops to 170° F, the thermostat 41, due to a change in the volume of the fluid in bulb 45, closes contacts 44 and 42 to energize blower 18. As the pressure from the outlet of the blower increases, pressure switch 57 closes its contacts to energize the coil of valve 31 to shift the valve plunger 31a to the position shown in the drawing. By closing the passageway between the outlet 27 in chamber 30 and opening the passageway 32 from the gas inlet 26 to the chamber 30, gas pressure will move the diaphragm 29 and connected valve 28 to the open position, permitting gas to flow to the outlet 27 and to the air conduit 16 as illustrated. As contacts 44 and 43 are separated at this time the damper 19 is closed and a minimum flow of air passes through the openings 20. This causes a pressure drop across the partition or baffle 21 and a lowered pressure above the diaphragm 35a, causing the valve 35 to be a substantial distance off of its seat and to bleed gas out of chamber 30 at its highest rate. This causes the valve 28 to assume its minimum flow position. The valve 28 will cycle between the minimum flow position and the off position in response to cycling of the contacts 42 and 44 as the water temperature fluctuates between 170° and 180° F.

Should the water temperature drop to 165°, the thermostat contacts 43 and 44 would close and energize the motor 23 to actuate the damper 19 to an open position. This causes a greater supply of air to flow to the furnace and increases the pressure above the diaphragm 35a of pressure regulator valve 35, to cause it to reduce the gas flow from chamber 30 of the main valve, and thus cause the valve 28 to move to a wider open position. The cycling of the contacts 43 and 44 causes the air damper 19 to modulate between a closed and maximum open position in accordance with heat demand, in a well known manner. As the air pressure varies, the position of diaphragm 35a also varies to, in turn, cause variations in the position of the valve 28. The result of this variation causes the fuel/air ratio to remain substantially constant for proper combustion.

When the temperature of the water rises to 175°, contacts 43 and 44 separate causing the air damper to return to its closed position providing a minimum air flow and, consequently, a minimum gas flow due to further adjustment of the valve 35. This returns the system to the control of contacts 42 and 44. Should the temperature rise still further, to 180°, the contacts 42 and 44 will break causing the gas valve to close and the blower to stop operating. Should the thermostat T still be unsatisfied, the water pump will continue to circulate water and cause the system to start up again as previously described. It is thus seen that the supplying of hot water to the space to be heated is controlled by the room thermostat whereas the water temperature is controlled by the thermostat 41. Only if a malfunction would occur that would cause the temperature of the water to rise to an unsafe level, for example 195° or 200° F, will the contacts of thermostat 48 separate to shut down the system.

The embodiments of the invention in which an exclusive property of right is claimed are defined as follows:

1. Combustion control apparatus, for a heating system having conduit means for delivering air to a furnace, air flow control means in said conduit means for adjusting the rate of air flow and constructed to always provide at least a minimum air flow and air flow restricting means in said conduit means, comprising:
   means for delivering fuel to said conduit means at a position downstream of said air flow restricting means, said fuel delivering means including on-off control means and pressure regulating control means responsive to fuel outlet pressure and a fuel flow restricting means in a portion of said fuel delivering means downstream of said pressure regulating control means,
   means responsive to air pressure upstream of said air flow restricting means to adjust the loading on said pressure regulating control means to maintain the outlet fuel pressure from said fuel delivering means substantially equal to said air pressure, and
   means responsive to a condition of the heating system for controlling the operation of said on-off control means and then adjusting said air flow control means in accordance with heat demand.

2. Combustion control apparatus as defined in claim 1 wherein said heating system has an air blower between said furnace and the air conduit where the fuel enters, so that said pressure regulating control means is adjusted by subatmospheric pressures.

3. Combustion control apparatus as defined in claim 1 wherein said condition responsive means has first and second control means with one controlling said on-off control means and the other controlling said air flow control means.

4. The combination of claim 3 wherein said air flow control means includes a modulating type of motor.

5. The combination of claim 3 wherein said first control means operates at one preselected condition of said system and said second control means operates at a second preselected condition of said system indicative of a need for a larger supply of fuel and air.

6. The combination of claim 5 wherein said first control means is a three-way valve and said fuel delivering means includes a diaphragm valve controlled by said three-way valve.

7. The combination of claim 6 wherein said pressure regulating means also controls said diaphragm valve.

8. Combustion control apparatus as defined in claim 1 wherein said condition responsive means has a single condition sensing means.

\* \* \* \* \*